Curtis & Tewksbury.
Hose & Pipe-Coupling.
N° 76057. Patented Mar. 31, 1868.
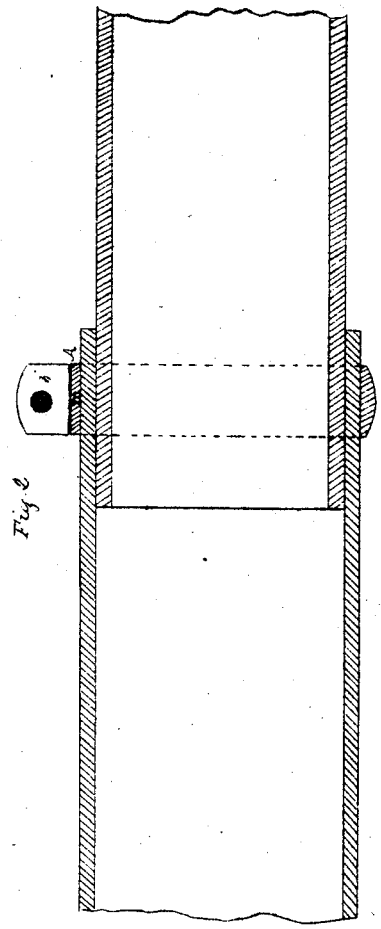
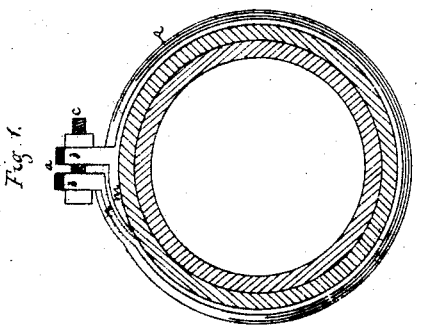
Witnesses:
M Combs.
G W Reed
Inventors:
Th. S. Curtis
W. D. Tewksbury

United States Patent Office.

M. S. CURTIS AND W. D. TEWKSBURY, OF NEW YORK, N. Y.

Letters Patent No. 76,057, dated March 31, 1868; antedated March 16, 1868.

IMPROVEMENT IN HOSE AND PIPE-COUPLINGS.

The Schedule referred to in these Letters Patent and making part of the same.

TO ALL WHOM IT MAY CONCERN:

Be it known that we, M. S. CURTIS and W. D. TEWKSBURY, both of the city, county, and State of New York, have invented a new and useful Improvement on Clamps for Hose-Connections and other purposes, of which the following is a full, clear, and exact description, reference being had to the accompanying drawing, forming part of this specification, and in which—

Figure 1 represents an end view of our improved clamp, as applied to securing rubber or leather hose on or to the end of a metal pipe, and Figure 2 a section at right angles to fig. 1, showing a like application of the improvement.

Similar letters of reference indicate corresponding parts.

In securing rubber or leather hose to the butt of a metal coupling, or end of a metal pipe, clamps have been used in the place of the wire lashing previously employed. These clamps have been of a ring-form, split or divided transversely, so that when slipped over the hose on the pipe end or butt, they might be tightened up by means of a screw-bolt, and not arranged to draw the ends of the ring together.

Such mode of fastening, however, possesses a defect which it is more immediately the object of our invention to remedy. Thus, in drawing together the ends of the divided ring, the rubber or leather is puckered or formed into a ridge, between the ends of the ring, which should not meet, so as to allow room for adjustment. This establishes a channel-way and leakage at such point or place, which frequently necessitates the use of a second similar ring, having its division arranged to break joint with the first ring. By this, our improvement, such draught or action upon the hose by the clamp in tightening up is avoided, and a close joint established without having recourse to a duplicate clamp, thus preventing leakage at a less cost, and with less labor in effecting the connection. This we accomplish by providing one end of the ring, on its inside face, with a peculiarly-shaped tongue or lip, and the opposite end of the ring with an internally-arranged recess, to receive within it said tongue, that forms an inner or underlapping projection, and, in connection with the recess, secures to the ring a comparatively close character, without destroying its annular shape or restricting its adjustment as a clamp.

Referring to the accompanying drawing, A represents such a ring or clamp, split or divided, as at $a$, with ears $b$, and screw-bolt and nut $c$, as usual, but differing from previous constructions in said ring being provided internally with, at its one end, a recess, $n$, of diminishing depth from its outer end or mouth, so as to receive loosely or freely within it a correspondingly-shaped tongue or lip, $m$, arranged to project from the opposite end of the ring. A clamp thus constructed, it will be seen, retains its inner rotundity, with freedom of adjustment, and without puckering the rubber or leather, or establishing leakage.

What is here claimed, and desired to be secured by Letters Patent, is—

A split or divided and adjustable-ring clamp, constructed with its one end recessed, as at $n$, to receive within it a tongue or lip, $m$, arranged to project from the opposite end, substantially as and for action or operation, as described.

M. S. CURTIS,
W. D. TEWKSBURY.

Witnesses:
J. W. COOMBS,
G. W. REED.